United States Patent
Plantan et al.

(10) Patent No.: US 7,708,122 B2
(45) Date of Patent: May 4, 2010

(54) AUTOMATIC SLACK ADJUSTER

(75) Inventors: Ronald S. Plantan, Westlake, OH (US); Kevin L. Kreidler, Brunswick, OH (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 1261 days.

(21) Appl. No.: 11/209,413

(22) Filed: Aug. 23, 2005

(65) Prior Publication Data
US 2007/0045065 A1    Mar. 1, 2007

(51) Int. Cl.
    *F16D 51/00* (2006.01)
(52) U.S. Cl. .............................. 188/79.55; 188/196 V
(58) Field of Classification Search ............. 188/79.55, 188/196 V
    See application file for complete search history.

(56) References Cited

U.S. PATENT DOCUMENTS

| | | |
|---|---|---|
| 3,997,035 A | 12/1976 | Zeidler |
| 4,440,268 A * | 4/1984 | Karlsson ................. 188/79.55 |
| 4,484,665 A * | 11/1984 | Svensson ................ 188/79.55 |
| 4,499,978 A | 2/1985 | Norcross |
| 5,036,958 A | 8/1991 | Yamamoto |
| 5,207,299 A | 5/1993 | Feldmann |
| 5,263,556 A | 11/1993 | Frania |
| 5,285,190 A | 2/1994 | Humphreys et al. |
| 5,305,856 A | 4/1994 | Edwards |
| 5,327,999 A | 7/1994 | Nelander |
| 5,350,043 A | 9/1994 | Crewson et al. |
| 5,664,647 A | 9/1997 | Edvardsson |
| 6,408,993 B1 | 6/2002 | Truuvert |
| 6,450,302 B1 | 9/2002 | Lyons |

FOREIGN PATENT DOCUMENTS

| | | |
|---|---|---|
| DE | 195 34 854 A1 | 3/1997 |
| EP | 0 319 693 A2 | 10/1988 |
| WO | WO 84/01411 | 4/1984 |

OTHER PUBLICATIONS

PCT International Search Report of corresponding Int App #PCT/US2006/023780; Intl Filing Date Jun. 16, 2006; Priority Date Aug. 23, 2005; Published Nov. 21, 2006.
PCT Written Opinion of the Int'l Searching Authority of the corres. Intl App No. PCT/US2006/023780; Intl Filing Date Jun. 16, 2006; Priorty Date Aug. 23, 2005; Publised Nov. 21, 2006.
JB John Bruce (UK) Ltd, Introducing the MEI Automatic Slack Adjusters, Brochure.
Haldex Commercial Vehicle Systems, Haldex Service Manual Truck and Trailer Applications Automatic Brake Adjusters, Innovative Vehicle Technology, L30033, Nov. 2001, North American Sales Division, Kansas City.
Bendix Commerical Vehicle Systems LLC, Service Data, Bendix ASA-5 Automatic Stack Adjuster, SD-05-1269, Mar. 2004, U.S.A.

* cited by examiner

*Primary Examiner*—Bradley T King
(74) *Attorney, Agent, or Firm*—Calfee, Halter & Griswold LLP

(57) ABSTRACT

A slack adjuster for a vehicle drum brake includes a pinion that rotates about a worm axis whenever the slack adjuster pivots. Excess clearance is taken up upon commencement of the apply stroke, at an accelerated rate. This enables a larger amount of initial clearance to be built into the brake.

24 Claims, 3 Drawing Sheets

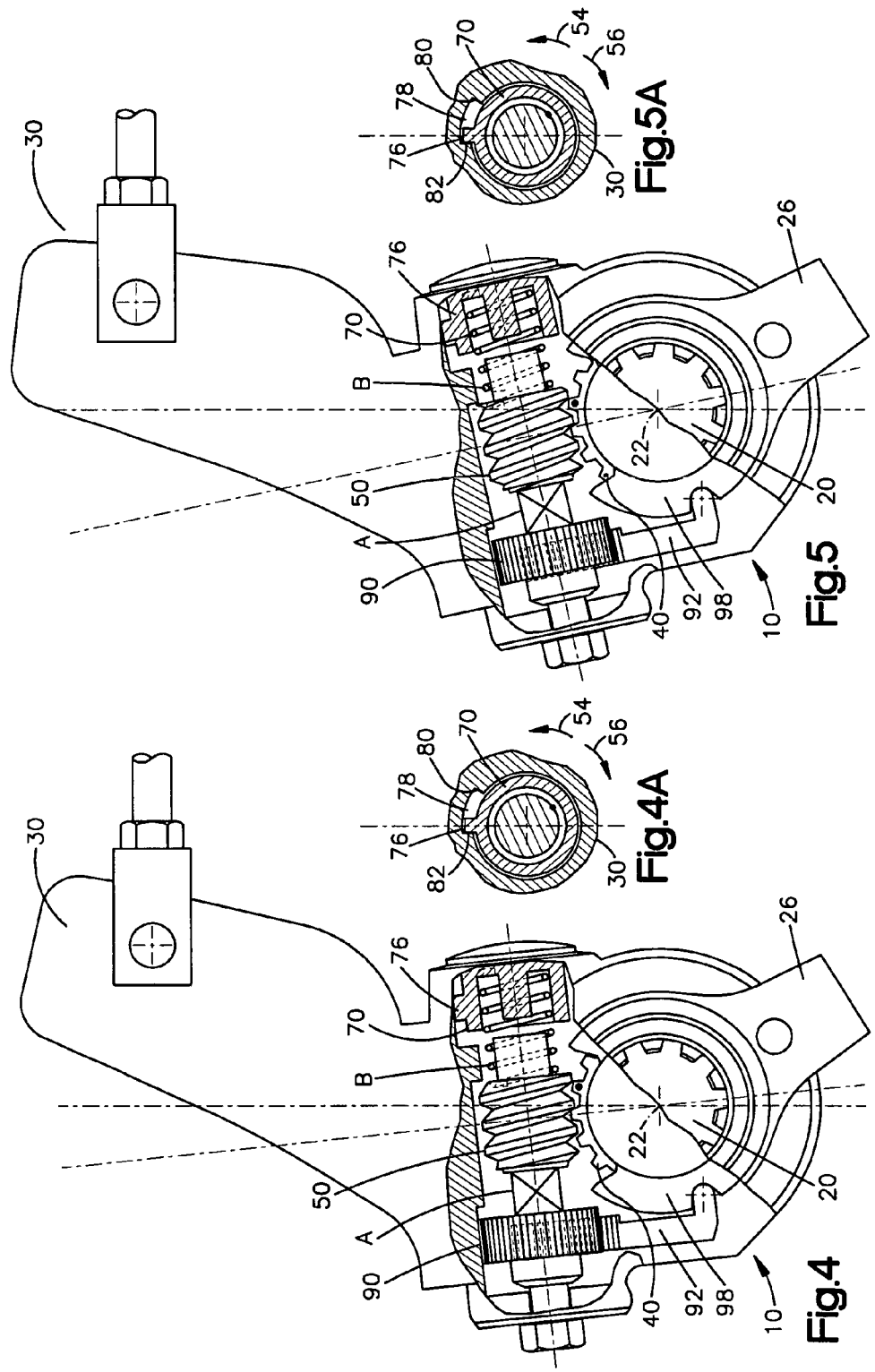

AUTOMATIC SLACK ADJUSTER

TECHNICAL FIELD

The present invention relates generally to a vehicle braking system and, in particular, to an automatic slack adjuster for use with a drum brake.

BACKGROUND

A vehicle drum brake has an initial (designed in) clearance between the brake shoes and the drum. The drum brake typically has an automatic slack adjuster that expands the shoes to compensate, as this clearance increases with wear. A problem can occur if the drum expands substantially from heat, for example, when a heavily loaded vehicle traverses a long downhill stretch and repeated applications of the brakes are needed. In this case, the expansion of the drum increases substantially the clearance between the shoes and the drum, possibly leading to a decreased braking effect. The automatic slack adjuster can expand the shoes in an attempt to keep up with the expansion of the drum. When a drum that is hot later cools off, however, it can shrink back to original shoe to drum clearance, minus any automatic adjustment that occurred during braking on the hill. The drum can in some cases shrink enough to bind on expanded shoes, causing brake drag. Some manufacturers compensate for this possibility by limiting the amount of adjustment that is provided with each brake application, in other words, very small increments, to reduce the likelihood of dragging brakes.

Some known slack adjusters adjust on the apply stroke. These adjusters, however, do not start this adjustment at the beginning of the apply stroke. Also, they do not have an increased, designed in clearance.

SUMMARY OF THE INVENTION

A method of applying principles of the present invention in one aspect relates to a method of operating a vehicle drum brake in response to actuation of the vehicle brake. The method includes the steps of: pivoting a slack adjuster body in an apply direction about a camshaft axis, in response to actuation of the brake; moving a worm that is in the slack adjuster body in an arc about the camshaft axis in response to the pivoting of the slack adjuster body; transmitting torque from the moving worm to a worm wheel thereby to apply a first torque to the worm wheel to effect rotation of the worm wheel about the camshaft axis in an apply direction; rotating a pinion about a worm axis in an apply direction during the initial period of pivoting of the slack adjuster body in the apply direction, in response to the pivoting of the slack adjuster body in the apply direction and during the step of moving the worm in the slack adjuster body; rotating the worm in an apply direction about the worm axis in response to rotational force of the pinion; transmitting torque from the rotating worm to the worm wheel thereby to apply a second torque to the worm wheel to effect rotation of the worm wheel about the camshaft axis at an increased speed in the apply direction; and rotating a brake camshaft with the worm wheel thereby to operate the vehicle brake.

In another aspect, an apparatus using principles of the invention relates to a slack adjuster for an actuatable vehicle drum brake that includes a rotatable drum and a brake shoe expandable into engagement with the drum by rotation of a camshaft. The slack adjuster includes a base, and a body supported on the base for pivoting movement relative to the base about a camshaft axis in an apply direction and a release direction, the body receiving braking force to rotate the body about the camshaft axis. A worm wheel is supported on the body for rotation about the camshaft axis. A worm is in meshing engagement with the worm wheel and supported on the body for rotation about a worm axis. A pinion is supported on the body for rotation about the worm axis. A first clutch selectively couples the worm for rotation with the pinion. A rack is in meshing engagement with the pinion. A worm control member is supported on the body for rotation about the worm axis. A second clutch selectively couples the worm control member for rotation with the worm. The pinion rotates about the worm axis whenever the body rotates relative to the base.

BRIEF DESCRIPTION OF THE DRAWINGS

FIG. 4 is a schematic sectional view similar to FIG. 2 showing the slack adjuster in a second position;

FIG. 4A is an end view of a portion of the slack adjuster of FIG. 4;

FIG. 5 is a schematic sectional view similar to FIG. 2 showing the slack adjuster in a third position; and FIG. 5A is an end view of a portion of the slack adjuster of FIG. 5.

DETAILED DESCRIPTION OF EMBODIMENTS OF THE INVENTION

Figures 1, 2, 2A:
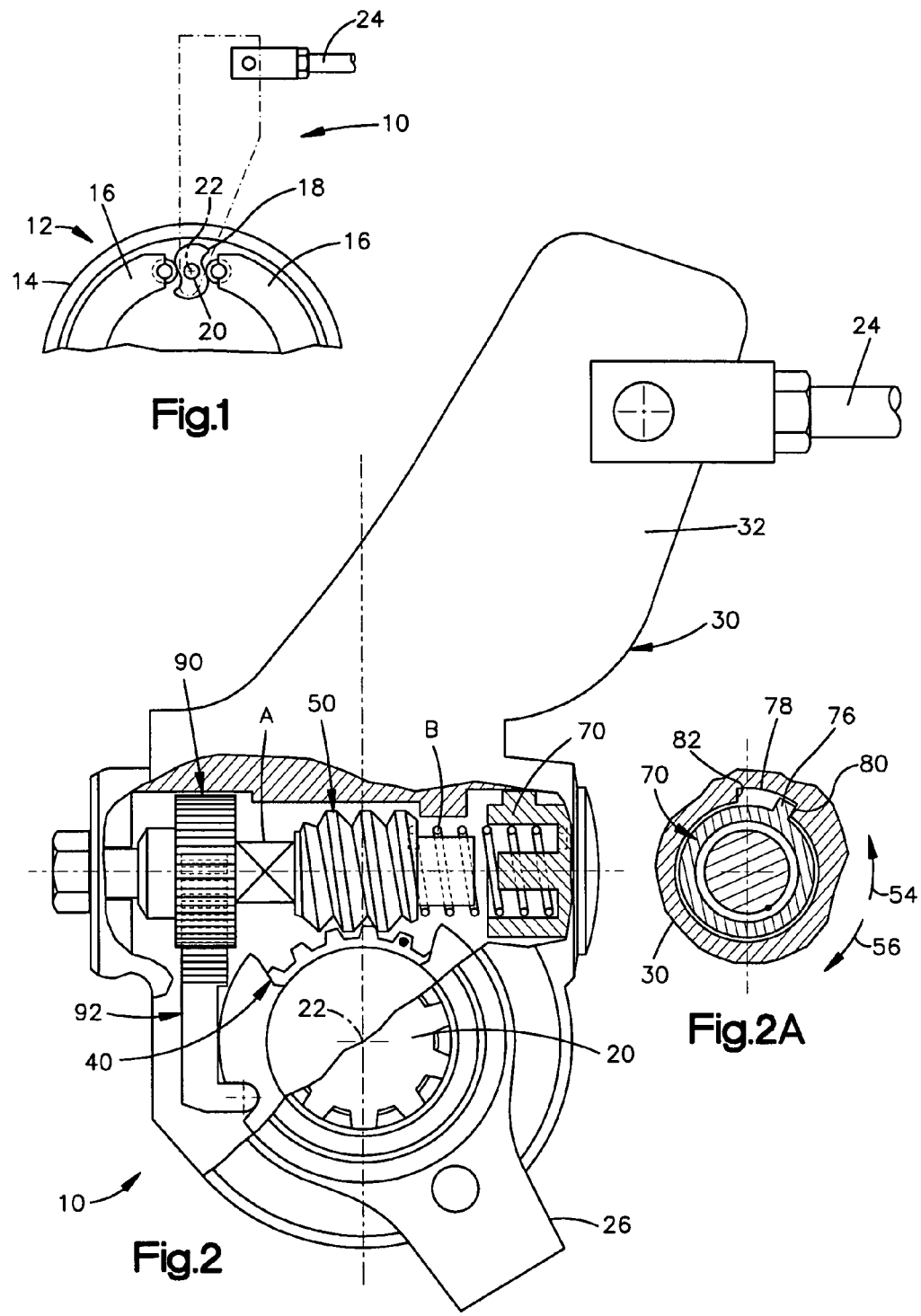
FIG. 1 is a schematic illustration of a portion of a vehicle braking system including a drum brake and an associated slack adjuster that illustrate aspects or principles of the present invention.
FIG. 2 is a schematic sectional view of the slack adjuster of FIG. 1, shown in a first position.
FIG. 2A is an end view of a portion of the slack adjuster of FIG. 2.

The present invention relates generally to a braking system and, in particular, to an automatic slack adjuster for use with a vehicle drum brake, and to a method of adjusting clearance of a vehicle brake. The invention is applicable to brakes and slack adjusters of differing constructions. As representative of the invention, FIGS. 1-5A illustrate schematically a vehicle slack adjuster 10, shown in phantom or outline in FIG. 1, in accordance with a first embodiment of the invention. The slack adjuster 10 is used in association with a vehicle brake 12 (FIG. 1).

The brake 12 includes a brake drum 14. The brake 12 also includes one or more brake shoes 16 that are expandable outwardly into engagement with the drum 14, in response to rotation of a cam 18. The cam 18 is on a camshaft 20. The camshaft 20 is rotatable about a first axis or camshaft axis 22. The term camshaft 20 as used herein refers to the member or structure that the slack adjuster 10 operates to effect actuation of the vehicle brake 12; in other braking systems, that member 20 could be some other piece or structure.

The camshaft 20 is rotatable by force applied from a pushrod 24 through the slack adjuster 10. The pushrod 24 receives braking force from a vehicle air brake chamber, for example. The slack adjuster 10 (FIG. 2) includes a base or support arm 26. The support arm 26 is fixed to a vehicle portion (not shown) and helps to support the slack adjuster 10 on the vehicle, giving the slack adjuster a reference point for determining chamber stroke.

The slack adjuster 10 also includes a body 30, which may be a metal casting. The body 30 is supported on the support arm 26 for pivotal movement relative to the support arm about the camshaft axis 22. The body 30 has a lever 32 to which the pushrod 24 is connected. The lever 32 of the body 30 receives braking force from the pushrod 24 and transmits that force to the other parts of the slack adjuster body and thereby to the other parts of the slack adjuster 10.

The slack adjuster 10 includes a worm wheel 40. The worm wheel 40 (FIG. 3) is supported in or on the body 30 for rotation relative to the body about the camshaft axis 22. The worm wheel 40 has internal splines to connect the camshaft 20 for rotation with the worm wheel 40. The worm wheel 40 also has external gear teeth 42.

The slack adjuster 10 includes a worm 50. The worm 50 is supported in the body 30 for rotation about a second axis, or worm axis, 52 in an apply direction (as shown by the arrow 54 in FIG. 2A) and in an opposite release direction (as shown by the arrow 56 in FIG. 2A). The worm axis 52 extends transverse to the camshaft axis 20.

The worm 50 (FIG. 3) has a worm gear portion 58 with external gear teeth 60 that are in meshing engagement with the external gear teeth 42 on the worm wheel 40. The worm 50 also has first and second opposite end portions 62 and 64 that project axially from the worm gear portion 58. The worm 50 is supported in position axially within the slack adjuster body 30 in a manner so that pivoting movement of the slack adjuster body about the camshaft axis 22 results in bodily (orbiting) movement of the worm about the camshaft.

The slack adjuster 10 includes a control member in the form of a spring retainer 70. In other embodiments the control member could have different constructions and some different functions. The spring retainer 70 is supported in the body 30 for rotation about the worm axis 52, in the apply direction 54 (FIG. 2A) and in the release direction 56 (FIG. 2A). The spring retainer 70 has a cup-shaped configuration with a radially extending end wall 72 and a cylindrical side wall 74 that extends parallel to the worm axis 52.

The spring retainer 70 has a radially projecting control tab 76. The control tab 76 is a portion of the spring retainer 70 that is disposed in and is movable angularly in a notch 78 in the body 30. The notch 78 has opposite ends 80 and 82 that serve as stops to limit the rotational movement of the spring retainer 70 relative to (in) the body 30.

In one embodiment, the spring retainer 70 may be rotatable through (may have a range of motion) of about 25 degrees about the worm axis 52. Other ranges are possible. The spring retainer 70 has a first position, or starting position, in which the tab 76 is adjacent the first end 80 of the notch 78, as shown in FIG. 2A. The spring retainer 70 has a second position, as shown in FIG. 4A, in which the tab 76 is at the second end 80 of the notch 78. During movement of the spring retainer 70 between the first and second positions, the spring retainer can be in any one of a plurality of different intermediate positions. The spring retainer 70 helps to control rotation of the worm 50 about the worm axis 52, in a manner as described below.

The slack adjuster 10 also includes a pinion mechanism which is a mechanism for transmitting rotational force to the worm shaft and the other structures rotatable about the worm axis 52. In the exemplary illustrated embodiment, the pinion mechanism takes the form of a pinion 90. The pinion mechanism could take different forms, for example, other types of gears or wheels The pinion 90 is supported in the body for rotation about a pinion axis; which may be the worm axis 52, in the apply direction 54 and in the release direction 56. The pinion 90 is fixed in position axially. The pinion 90 has external pinion gear teeth. The pinion 90 is spaced axially from the worm gear portion 58 of the worm 50.

The slack adjuster 10 includes a link for transmitting force to the pinion mechanism. In the exemplary illustrated embodiment, the link takes the form of a rack 92. The link could take different forms, for example, other types of gears or wheels or links. The rack 92 has a set of rack teeth that are in meshing engagement with the external teeth on the pinion 90. The rack 92 has at its end opposite the pinion 90 an arcuate end tab 94. The end tab 94 is received in an arcuate notch 96 in a control disk 98. The control disk 98 is fixed to the support arm 26 and thus does not rotate about the camshaft axis 22. The control disk 98 may be part of the control arm 26, or may be another piece that is fixed to the control arm.

The arcuate notch 96 in the control disk 98 receives closely the arcuate end tab 94 of the rack 92; there is no gap, or no significant gap, in which the end tab of the rack is movable, and as a result, the rack is effectively fixed in position within the support arm 26 except for pivoting movement about the center of the end tab. Thus, immediately or substantially immediately upon commencement of any pivoting movement of the slack adjuster body 30 about the camshaft axis 22, there occurs relative motion between the rack 92 and the pinion 90.

The slack adjuster 10 includes a first clutch, shown schematically at A. The first clutch A selectively couples the pinion 90 and the worm 50 for rotation. The first clutch A may take different forms, including clutches that are known in the art. As one example, the first clutch A may be a cone clutch. Generally, a clutch is a device or structure or assembly that allows rotation in one direction but restricts rotation in the opposite direction.

The first clutch A is a device or structure or assembly that is operative to transmit rotational force from the pinion 90 to the worm 50, causing the worm to rotate. The first clutch A may slip in which case rotational force of the pinion 90 is not transmitted to the worm. The apply direction of rotation 54 is the high torque direction of clutch A—that is, clutch A is operable to transmit a relatively high level of torque from the pinion 90 to the worm 50 in the apply direction of rotation 54, before slipping. The release direction of rotation 56 is the low torque direction of clutch A—that is, clutch A is operable to transmit a relatively low level of torque from the worm 50 to the pinion 90 in the release direction of rotation, before slipping.

The slack adjuster 10 includes a second clutch, shown schematically at B. The second clutch B selectively couples the worm 50 to the spring retainer 70. The second clutch B may take different forms, including clutches that are known in the art. In the illustrated embodiment, the second clutch is a spring. In this case, one end portion of the spring B is fixed to the second end portion 64 of the worm 50. The other end portion of the spring B is fixed to the spring retainer 70. Alternatively, the second clutch B may take different forms.

The second clutch B is operative to transmit rotational force from the worm 50 to the spring retainer 70, causing the spring retainer to rotate. The second clutch B may slip in which case rotational force of the worm 50 is not transmitted to the spring retainer 70. The apply direction of rotation 54 is the low torque direction of clutch B—that is, clutch B is operable to transmit a relatively low level of torque from the worm 50 to the spring retainer 70 in the apply direction of rotation, before slipping so that the worm is rotatable relative to the spring retainer. The release direction of rotation 56 is the high torque direction of clutch B—that is, clutch B is operable to transmit a relatively high level of torque between the worm 50 and the spring retainer 70 in the release direction of rotation, before slipping.

Figure 3:
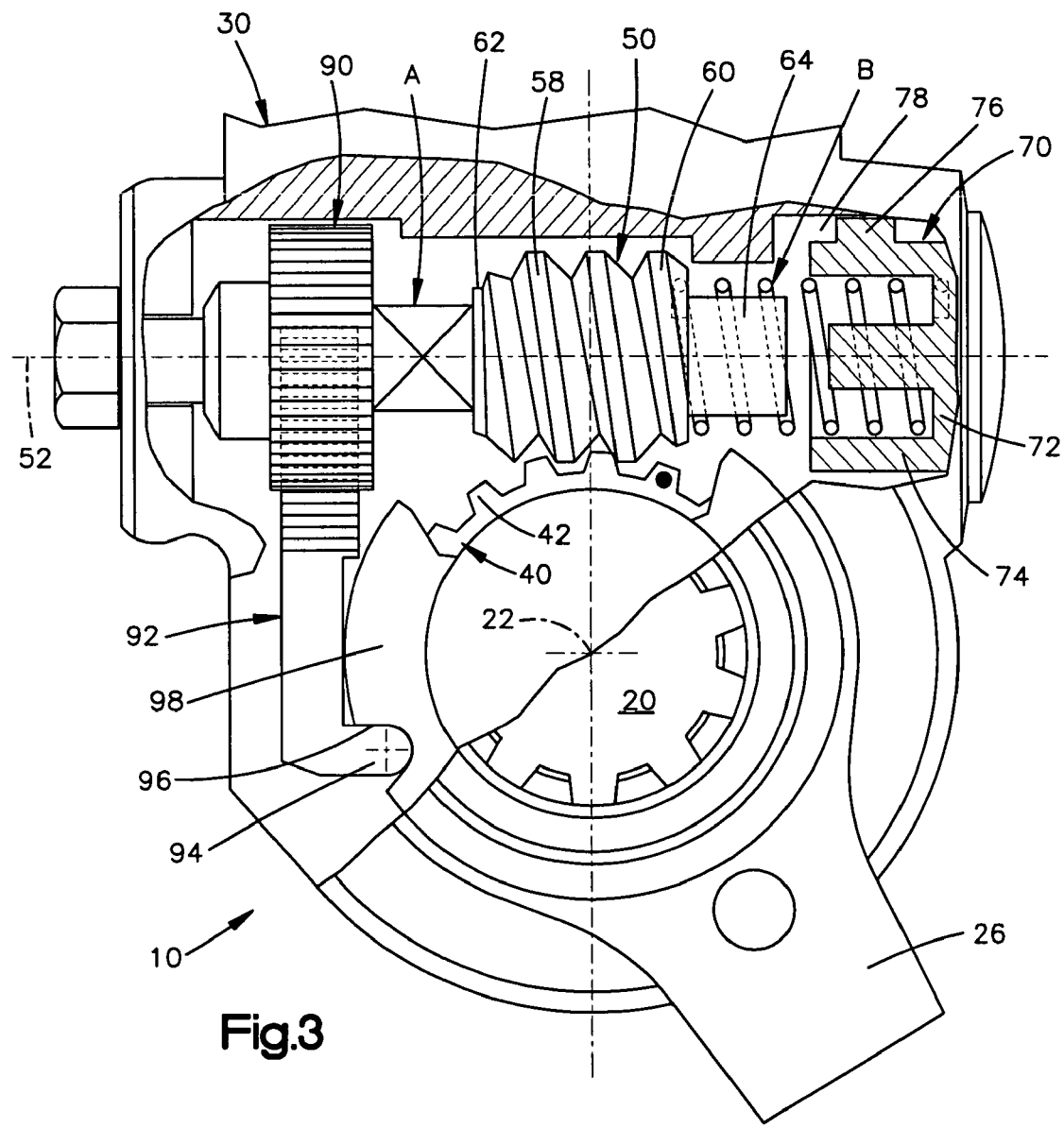
FIG. 3 is an enlarged schematic sectional view of the slack adjuster of FIG. 1 shown in the first position.

FIGS. 2, 2A and 3 illustrate the parts of the slack adjuster 10 in the zero stroke condition of the vehicle braking system.

In this condition, there is a designed in clearance between the brake shoes 16 (FIG. 1) and the brake drum 14. The amount of this clearance is increased significantly so that even if a braking situation as described above produces a significantly expanded drum, the relatively large initial clearance allows for eventual cooling and shrinkage of the drum without it binding on the shoes. As described below, the brake starts to take up initial clearance immediately upon actuation of the brakes, and at a significantly increased rate. As a result, for each unit of stroke, more clearance is taken up, as compared to with the prior art design. For example, in the prior art design, 1.2 inches of stroke may be needed in order to take up 0.050" of initial clearance, while with an adjuster in accordance with principles of one embodiment of the invention, only 0.5 inches of stroke might be needed in order to take up that same 0.050" of initial clearance.

In the zero stroke condition shown in FIGS. 2, 2A and 3, the spring retainer 70 is in a position of angular rotation such that its control tab 76 is located at the stop 80 at one end of the notch 78 in the slack adjuster body 30. This is illustrated in FIG. 2A.

When the brakes are first applied (position 1) the parts of the slack adjuster 10 move initially from the position shown in FIG. 2 to the position shown in FIG. 4. This first period of movement is referred to herein as Period 1.

During Period 1, the entire slack 10 including the body 30 pivots as a whole about the camshaft axis 22. Whenever the slack 10 pivots, the pinion 90 orbits in an arc about the camshaft axis 22. The support arm 26, however, which is fixed in position, does not pivot or otherwise move. The rack 92 has its end tab 94 located in the notch 96 in the control disk 98, which is fixed to the support arm 26, without clearance on either side of the end tab. The rack 92 therefore does not orbit about axis 22, instead only pivoting about its arcuate end tab 94 relative to the control disk 98. The pinion 90 therefore moves relative to the rack 92.

Specifically, whenever the slack 10 pivots, the pinion 90 is caused to slide along the rack 92. Because the rack 92 is always engaged with the pinion 90, the sliding movement of the pinion causes the pinion to rotate about the worm axis 52. Thus, the pinion 90 rotates about the worm axis 52 whenever the slack 10 is moving as a whole about the camshaft axis 22.

When the parts are in the zero stroke position, clutch A is engaged (in its high torque mode) and so the rotation of the pinion 90 is transmitted to the worm 50. This force causes the worm 50 to rotate in the apply direction 54 about the worm axis 52.

When the parts are in the zero stroke position, clutch B is able to transmit the force of rotation of the worm 50 to the spring retainer 70, causing the spring retainer to rotate about the worm axis 52 in the apply direction 54. During Period 1, the spring retainer 70 rotates until its control tab 76 moves to the opposite end 82 of the notch 78 in the body 30 (marking the end of period 1).

Because the worm 50 is rotating on its axis 52 during Period 1, it is driving the worm wheel 40 for rotation about the camshaft axis 22. Torque is transmitted to the worm wheel 40 for this reason. In addition, the worm 50 is moving bodily in an arc about the camshaft axis 22, because of the pivoting movement of the slack 10 about the camshaft axis, relative to the worm wheel 40, and so torque is transmitted to the worm wheel for this reason also. These two rotational driving forces are additive, and so the worm wheel 40 rotates faster or at a higher rate (for a given amount of stroke) about the camshaft axis 22, than it would rotate if it were being driven by only the overall pivoting movement of the slack 10. Because the worm wheel 40 is splined to the camshaft 20, the camshaft also rotates faster (for the same amount of stroke).

During Period 1, the initial clearance, or designed in clearance, between the brake shoes 16 and the brake drum 14, is being taken up. The "additive" effect of the two torques driving the worm wheel 40 causes the initial (designed in) clearance to be taken up at a higher rate. In addition, the rotation of the worm 50 about the worm axis 52 effects "adjustment" of the brake, taking up at least some excess initial clearance, during this time period.

At some point in this movement, the control tab 76 on the spring retainer 70 (which is being rotated by the pinion 90 and the worm 50) reaches the stop surface 82 that defines the end of its range of angular movement within the notch 78 in the body 30. When this occurs, the spring retainer 70 stops rotating about the worm axis 52. The parts are in the position shown in FIGS. 4 and 4A, and designated herein Position 2.

Thus, during Period 1, which is the movement from Position 1 to Position 2, the initial clearance is taken up, and at least some "adjustment" of excess shoe to drum clearance is effected, and the worm 50 rotates a particular amount, rotating the camshaft 20 at the "additive" rate. This mode of operation reduces the amount of free stroke, that is, reduces the amount of stroke during which no braking action is occurring.

This accelerated or "additive" adjustment, which starts during Period 1, commences immediately (or almost immediately) upon the application of braking force to the adjuster 10 through the pushrod 24 and consequent pivoting of the slack adjuster body 30. This is effected by having no gap between the rack 92 and the control disc 98, so that the rack is basically immobile and when the slack adjuster body 30 commences pivoting the pinion 90 moves immediately relative to the rack 92.

It should be understood, however, that this motion may not be exactly "immediate". For example, due to wear of parts, or manufacturing tolerances, or parts assembly requirements, some gap might be present that delays rotation of the pinion. However, having the pinion rotation commence in the first portion of the movement of the slack adjuster body 30 in the apply direction, so that the adjustment is made upon the apply stroke before shoe to drum contact, is desirable. One example of such movement in the first portion is set forth herein; others are possible.

Of course, if there is no excess clearance to be taken up in the brake, then there is no "adjustment", that is, no rotation of the worm 50 in the "apply" direction 54 by an amount that is greater than that in the "release" direction.

During the next period of time during the apply stroke, which is designated Period 2 herein, the slack 10 continues to rotate as a whole about the camshaft axis 22, from Position 2 as shown in FIGS. 4 and 4A to a Position 3 as shown in FIGS. 5 and 5A, under the influence of the force from the actuator rod 24. This movement of the slack 10 causes further rotation of the camshaft 20, and reduction of the shoe-to-drum clearance both through taking up of initial clearance and adjustment. Eventually during this time period, the shoe 16 contacts the drum 14 and rotation into the elasticity of the foundation brake 12 begins.

During Period 2, the pinion 90 continues to be driven for rotation by its sliding movement along the rack 92. Clutch A is still engaged, so the worm gear 50 continues to be driven to rotate by the pinion 90. The spring retainer 70, however, is blocked from rotation because the tab 76 is engaged with the notch surface 82. The worm 50 therefore rotates relative to the spring retainer 70, with clutch B slipping.

During this Period 2, the slack 10 continues to effect adjustment of the brake 12—that is, the taking up of both the initial clearance and the excess clearance; at the same "additive" rate as discussed above. The "adjustment" continues only until the worm 50 locks due to the high torque experienced at Position 3 as discussed below. Therefore, at Position 3, "adjustment" or taking up of excess clearance stops. Also, during Period 2, when the brake 12 engages, initial clearance is completely taken up.

Period 2 ends and Period 3 begins when the engagement of the brake 12 resulting from the particular level of brake chamber force that is being applied is sufficient to resist further rotation of the camshaft, and clutch A begins to slip. The brake shoes 16 are pressed hard enough against the drum 14 so that there is a great increase in the resistance to rotation of the camshaft 20 (and thus of the worm wheel 40). This torque is transmitted back through the worm wheel 40 to the worm 50 and stops the worm from rotating about its axis 52.

Because the brakes may still be being "applied", however, the slack 10 may be rotating as a whole and the pinion 90 sliding along the rack 92. This would cause the pinion 90 to rotate, and this rotation of the pinion would be accommodated by clutch A slipping so that the pinion can rotate relative to the (now fixed) worm 50. There is no taking up of either initial or excess clearance during Period 3.

When force on the brake pedal is decreased, the slack 10 begins to rotate back, as a whole, toward the starting position, under the influence of the return spring in the brake 12 and also a return spring (not shown) in the brake chamber. Therefore, the pinion 90 slides along the rack 92, this time in the opposite direction. This relative movement between the pinion 90 and the rack 92 rotates the pinion in the opposite (release) direction 56 about the worm axis 52. Clutch A, however, slips, and, as a result, the rotation of the pinion 90 does not cause the worm 50 to rotate. The pinion 90 is the only element that rotates about the worm axis 52 at this time—the worm 50 does not rotate and therefore the spring retainer 70 does not rotate. In addition, the worm wheel 40 still resists turning, preventing the worm 50 from rotating.

Because the worm 50 is not rotating, the previously set adjustment of the initial clearance is not affected. Also, no initial clearance is being set, because the brakes are still engaged.

Once the brake shoes 16 move off the drum 14 far enough so that the shoe/drum engagement no longer resists rotational movement of the worm wheel 40, the worm wheel and the worm 50 start to rotate. This is the beginning of Period 5. Because the worm 50 is free to rotate in the release direction 56, Clutch A engages in its "low torque" direction and, as a result, the rotation of the pinion 90 causes the worm 50 to start rotating in the release direction toward its original index position. Clutch B also engages because of the direction of rotation, i.e., this is the high torque direction or "grab" direction of clutch B. As a result, the rotation of the pinion 90 is transmitted to the worm 50 and thereby to the spring retainer 70, both of which rotate.

The rotation of the spring retainer 70 causes its tab 76 to move from one end 82 of the notch 80 back to its starting position at the first end 80 of the notch. At this point, the spring retainer 70 can no longer rotate, and, because of the engagement of clutch B, the worm 50 stops rotating. This is the end of Period 5.

The rotation of the worm 50 during Period 5 provides a "reverse multiplication" effect on the rotational speed of the worm wheel 40, which is already rotating about the camshaft axis 22 because of overall slack rotation. During this time Period 5 the brake shoes 16 move out of engagement with the drum 14. This is done at the faster "additive" rate. This is therefore a period of "de-adjustment" to providing of initial clearance.

The slack 10 continues to rotate back, as a whole, toward the zero stroke position. The pinion 90 continues to slide along the rack 92, and the pinion and the worm 50 and the spring retainer 70 continue to rotate back in the release direction 56. During this period the "designed in" clearance of the brake 12 is being provided. No adjustment is being made, however, since the worm 50 is not turning on its axis 52.

During Period 6, clutch A is slipping because it is being driven in its low torque direction, and so the blockage of the worm 50 from rotation does not result in rotational blockage of the pinion 90. The pinion 90 can continue rotating under the force applied by the rack 92 as the body 30 moves back as a whole toward the zero stroke position. Once the return springs move the slack 10 all the way back to the zero stroke position, the process is completed.

At this point, all the parts of the slack 10 are in the same position as initially, with the exception that that the worm 50 has rotated in the "apply" direction 54 more than it rotated back in the "release" direction 56. Therefore, the worm 50 has indexed. This reflects the brake adjustment that has occurred, which occurred because of worm rotation after the spring retainer 70 stopped.

From the above description of the invention, those skilled in the art will perceive improvements, changes, and modifications in the invention. Such improvements, changes, and modifications within the skill of the art are intended to be included within the scope of the appended claims.

Having described the invention, we claim:

1. A method of operating a vehicle drum brake in response to actuation of the vehicle brake, said method comprising the steps of:

pivoting a slack adjuster body in an apply direction about a camshaft axis, in response to actuation of the brake;

moving a worm that is in the slack adjuster body in an arc about the camshaft axis in response to the pivoting of the slack adjuster body;

transmitting torque from the moving worm to a worm wheel thereby to apply a first torque to the worm wheel to effect rotation of the worm wheel about the camshaft axis in an apply direction;

rotating a pinion mechanism about a pinion axis in an apply direction during the initial period of pivoting of the slack adjuster body in the apply direction, in response to the pivoting of the slack adjuster body in the apply direction and during the step of moving the worm in the slack adjuster body;

rotating the worm in an apply direction about a worm axis in response to rotational force of the pinion mechanism;

transmitting torque from the rotating worm to the worm wheel thereby to apply a second torque to the worm wheel to effect rotation of the worm wheel about the camshaft axis at an increased speed in the apply direction;

rotating a brake camshaft with the worm wheel thereby to operate the vehicle drum brake;

rotating a control member with the worm during the initial period of pivoting of the slack adjuster body in the apply direction to take up initial clearance and excess clearance, the control member being rotatable about the worm axis for helping to control the rotation of the worm about the worm axis;

blocking rotation of the control member after a predetermined amount of rotation; and thereafter rotating the worm further in the apply direction to take up additional excess clearance until brake resistance blocks further worm rotation.

2. A method as set forth in claim 1 wherein the first torque and the second torque are additive so that the worm wheel rotates faster than it would rotate if it were being driven only by the first torque.

3. A method as set forth in claim 1, said method including the steps of:
blocking rotation of the control member and the worm and the worm wheel during a first period of pivoting of the slack adjuster body in a release direction;
enabling rotation of the control member and the worm and the worm wheel in a release direction during a second period of pivoting of the slack adjuster body in the release direction; and
enabling rotation of the worm wheel but not the worm and the control member during a third period of pivoting of the slack adjuster body in the release direction.

4. A method as set forth in claim 1 wherein said step of rotating the pinion mechanism is commenced substantially immediately upon pivoting of the slack adjuster body in the apply direction.

5. A method as set forth in claim 1 wherein the pinion mechanism is in meshing engagement with a link that is supported in the slack adjuster body but that is not movable with the slack adjuster body, and wherein the slack adjuster body and the pinion mechanism move relative to the link upon commencement of and in response to the pivoting of the slack adjuster body in the apply direction.

6. A method as set forth in claim 5 wherein the link is in engagement with the control member that does not move when the slack adjuster body pivots, and the link does not move relative to the control member.

7. A method as set forth in claim 6 wherein the link has an end portion in engagement in a notch in the control member without a gap therebetween.

8. A method as set forth in claim 1 wherein said step of applying a first torque to the worm wheel effects take-up of the initial clearance in the drum brake, said step of applying a second torque to the worm wheel effects take-up of the excess clearance, and further including the step of rotating the pinion mechanism about the worm axis whenever the slack adjuster body is pivoting about the camshaft axis.

9. A method of operating a vehicle drum brake having a designed-in initial clearance between the brake shoe and drum and having excess clearance between the brake shoe and drum, said method comprising the steps of:
pivoting a slack adjuster body in an apply direction about a camshaft axis, in response to actuation of the vehicle brake;
taking up initial clearance upon commencement of said pivoting step; and taking up additional clearance immediately upon commencement of said pivoting step;
rotating a control member with a worm in the slack adjuster body during the initial period of pivoting of the slack adjuster body in the apply direction to take up initial clearance and excess clearance, the control member being rotatable about a worm axis for helping to control the rotation of the worm about the worm axis;
blocking rotation of the control member after a predetermined amount of rotation; and thereafter
rotating the worm further in the apply direction to take up additional excess clearance until brake resistance blocks further worm rotation.

10. A method as set forth in claim 9 including the step of rotating a pinion mechanism in the slack adjuster body about a pinion axis whenever the slack adjuster body is pivoting about the camshaft axis.

11. A method as set forth in claim 9 wherein:
said step of taking up initial clearance comprises rotating a worm wheel in the slack adjuster body in an apply direction about a camshaft axis to apply a first torque to a camshaft; and
said step of taking up excess clearance comprises rotating the worm that is in engagement with the worm wheel about the worm axis to apply a second torque to the camshaft, the first and second torques being additive.

12. A method as set forth in claim 9 further including the steps of: after actuation of the brake, pivoting the slack adjuster body in a release direction to release the brake; providing initial clearance subsequent to commencement of said step of pivoting the slack adjuster body in the release direction; and providing an increased amount of initial clearance simultaneously with said step of providing initial clearance.

13. A method as set forth in claim 12 wherein: said step of providing initial clearance comprises pivoting a slack adjuster body in a release direction about a camshaft axis to apply a first torque to a camshaft; and said step of providing an increased amount of initial clearance comprises rotating a worm to rotate a worm wheel to apply a second torque to the camshaft, the first and second torques being additive.

14. A method as set forth in claim 13 including the step of rotating a pinion mechanism in the slack adjuster body about the axis of the worm whenever the slack adjuster body is pivoting about the camshaft axis.

15. Apparatus for adjusting a vehicle drum brake in response to actuation of the vehicle brake, said apparatus comprising:
a slack adjuster body with a stop surface within a notch, the slack adjuster body pivotable in an apply direction about a camshaft axis in response to actuation of the brake;
first means for transmitting torque from the slack adjuster body to a worm wheel thereby to apply a first torque to the worm wheel to effect rotation of the worm wheel about the camshaft axis in an apply direction, the first means comprising a worm;
second means for transmitting torque to the worm wheel during an initial period of pivoting of the slack adjuster body in the apply direction thereby to apply a second torque to the worm wheel, additive to the first torque, to effect rotation of the worm wheel about the camshaft axis at an increased speed in the apply direction, a brake camshaft rotatable with the worm wheel thereby to adjust the vehicle brake;
a control member rotatably supported in the slack adjuster body and rotatable with the worm during the initial period of pivoting of the slack adjuster body in the apply direction to take up initial clearance and excess clearance, the control member being rotatable about a worm axis for helping to control the rotation of the worm about the worm axis;
wherein the control member is blocked from rotating by the stop surface after a predetermined amount of rotation; and thereafter
the worm is further rotatable by the second means in the apply direction to take up additional excess clearance until brake resistance blocks further worm actuation.

16. Apparatus as set forth in claim 15 wherein:
said first means comprises the worm in the slack adjuster body movable in an arc about the camshaft axis in response to the pivoting of the slack adjuster body, the worm being in engagement with the worm wheel; and said second means comprises a pinion mechanism rotatable on a pinion axis in an apply direction during the initial period, in response to the pivoting of the slack adjuster body in the apply direction and during the step of moving the worm in the slack adjuster body, the worm rotating in the apply direction about a worm axis in response to rotational force applied from the pinion mechanism.

17. A slack adjuster for an actuatable vehicle drum brake that includes a rotatable drum and a brake shoe expandable into engagement with the drum by rotation of a camshaft, said slack adjuster comprising:

a base;

a body with a stop surface within a notch, the body supported on said base for pivoting movement relative to said base about a camshaft axis in an apply direction and a release direction, said body receiving braking force to rotate said body about said camshaft axis;

a worm wheel supported on said body for rotation about said camshaft axis; a worm in meshing engagement with said worm wheel and supported on said body for rotation about a worm axis;

a pinion mechanism supported on said body for rotation about said worm axis;

a first clutch selectively coupling said worm for rotation with said pinion mechanism;

a link in meshing engagement with said pinion mechanism;

a worm control member supported on said body for rotation about said worm axis for helping to control the rotation of the worm about the worm axis, the control member rotating with the worm during the initial period of pivoting the slack adjuster body in the apply direction to take-up initial clearance and excess clearance;

a second clutch selectively coupling said worm control member for rotation with said worm;

wherein said pinion mechanism is rotatable about said worm axis whenever said body rotates relative to said base;

wherein the control member is blocked from rotating by the stop surface after a predetermined amount of rotation; and wherein the worm is further rotatable by the pinion mechanism in the apply direction to take up additional excess clearance until brake resistance blocks further worm rotation.

18. A slack adjuster as set forth in claim 17 wherein said worm control member is supported on said body for limited rotation about said worm axis, and wherein the rotational position of said control member is a factor in determining the condition of said second clutch and thereby the rotational state of said worm.

19. A slack adjuster as set forth in claim 18 wherein said slack adjuster has a zero stroke position, when the drum brake is not actuated, in which a portion of said link is in engagement with said base in a manner to effect substantially immediate movement of said pinion mechanism relative to said link upon commencement of pivoting of said body.

20. A slack adjuster as set forth in claim 18 wherein said slack adjuster body and said pinion mechanism move relative to said link upon commencement of and in response to pivoting of said body in the apply direction.

21. A method of adjusting a vehicle drum brake in response to actuation of the vehicle brake, said method comprising the steps of:

pivoting a slack adjuster body in an apply direction about a camshaft axis, in response to actuation of the brake;

moving a worm that is in the slack adjuster body in an arc about the camshaft axis in response to the pivoting of the slack adjuster body;

transmitting torque from the moving worm to a worm wheel thereby to apply a first torque to the worm wheel to effect rotation of the worm wheel about the camshaft axis in an apply direction;

rotating a pinion mechanism about a worm axis in an apply direction during the initial period of pivoting of the slack adjuster body in the apply direction, in response to the pivoting of the slack adjuster body in the apply direction and during the step of moving the worm in the slack adjuster body;

rotating the worm in an apply direction about the worm axis in response to rotational force of the pinion mechanism;

transmitting torque from the rotating worm to the worm wheel thereby to apply a second torque to the worm wheel to effect rotation of the worm wheel about the camshaft axis at an increased speed in the apply direction;

rotating a brake camshaft with the worm wheel thereby to adjust the vehicle brake;

rotating a control member with the worm during the initial period of pivoting of the slack adjuster body in the apply direction to take up initial clearance and additional clearance, the control member being rotatable about the worm axis for helping to control the rotation of the worm about the worm axis;

blocking rotation of the control member after a predetermined amount of rotation; and thereafter rotating the worm further in the apply direction to take up additional excess clearance until the brake resistance blocks further worm rotation.

22. A method as set forth in claim 21 wherein the pinion mechanism is in meshing engagement with a link that is supported in the slack adjuster body but that is not movable with the slack adjuster body, and wherein the slack adjuster body and the pinion mechanism move relative to the link upon commencement of and in response to the pivoting of the slack adjuster body in the apply direction.

23. A method as set forth in claim 22 wherein the link is in engagement with a control member that does not move when the slack adjuster body pivots, and the link does not move relative to the control member.

24. A method as set forth in claim 23 wherein the link has an end portion in engagement in a notch in the control member without a gap therebetween.

* * * * *